(12) United States Patent
Nelson et al.

(10) Patent No.: US 7,742,250 B2
(45) Date of Patent: Jun. 22, 2010

(54) SPECTRAL ANALYSIS OF A POSITION ERROR SIGNAL

(75) Inventors: Jeff Nelson, Boulder, CO (US); Farhad Navid, Boulder, CO (US); Richard Martin, Longmont, CO (US); Anton Viktorovich Goldade, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 580 days.

(21) Appl. No.: 11/652,867

(22) Filed: Jan. 12, 2007

(65) Prior Publication Data

US 2008/0170315 A1    Jul. 17, 2008

(51) Int. Cl.
*G11B 27/36* (2006.01)

(52) U.S. Cl. .............................. 360/31; 360/30; 360/43

(58) Field of Classification Search ................... 360/31, 360/30, 43
See application file for complete search history.

(56) References Cited

U.S. PATENT DOCUMENTS

| | | | |
|---|---|---|---|
| 5,128,813 A | 7/1992 | Lee | |
| 5,280,603 A | 1/1994 | Jeppson et al. | |
| 5,852,529 A * | 12/1998 | Ko et al. | 360/77.14 |
| 5,930,067 A * | 7/1999 | Andrews et al. | 360/77.04 |
| 6,643,084 B1 * | 11/2003 | Andrew et al. | 360/53 |
| 6,809,995 B2 | 10/2004 | Kadlec et al. | |
| 6,813,226 B2 | 11/2004 | Kadlec et al. | |
| 6,859,346 B1 | 2/2005 | Meyer | |
| 6,882,601 B2 | 4/2005 | Kadlec et al. | |
| 6,885,619 B2 | 4/2005 | Watt | |
| 6,904,007 B2 | 6/2005 | Kadlec et al. | |
| 6,906,985 B2 | 6/2005 | Kadlec et al. | |
| 6,934,113 B1 | 8/2005 | Chen | |
| 6,950,380 B2 | 9/2005 | Watt et al. | |
| 6,958,957 B2 | 10/2005 | Kadlec et al. | |
| 6,965,547 B2 | 11/2005 | Kadlec et al. | |
| 6,970,403 B2 | 11/2005 | Kadlec et al. | |
| 6,975,472 B2 | 12/2005 | Stover et al. | |
| 6,999,265 B1 | 2/2006 | Schreck et al. | |
| 7,023,776 B2 | 4/2006 | Kadlec et al. | |
| 7,027,247 B2 | 4/2006 | Heydari et al. | |
| 7,092,322 B2 | 8/2006 | Kadlec et al. | |
| 2001/0036027 A1 | 11/2001 | Min et al. | |
| 2002/0097643 A1 | 7/2002 | Kadlec et al. | |
| 2002/0110056 A1 | 8/2002 | Kadlec et al. | |
| 2002/0110057 A1 | 8/2002 | Kadlec et al. | |
| 2002/0114230 A1 | 8/2002 | Kadlec et al. | |
| 2002/0118614 A1 | 8/2002 | Watt et al. | |
| 2002/0131339 A1 | 9/2002 | Kadlec et al. | |
| 2002/0131341 A1 | 9/2002 | Kadlec et al. | |
| 2002/0131342 A1 | 9/2002 | Kadlec et al. | |

(Continued)

*Primary Examiner*—Joseph H Feild
*Assistant Examiner*—Huy D Nguyen
(74) *Attorney, Agent, or Firm*—Kirk A. Cesari; Westman, Champlin & Kelly, P.A.

(57) ABSTRACT

The present disclosure is directed to spectral analysis of a position error signal. In a particular embodiment, the method includes analyzing a spectral content of a position error signal. The method also includes comparing the spectral content to a threshold. Further, the method includes determining a result based on the comparing the spectral content to the threshold. In another particular embodiment, the spectral content of the position error signal is determined by performing a discrete fourier transform (DFT) on the error signal, determining a magnitude of the DFT output, and low pass filtering the magnitude.

19 Claims, 5 Drawing Sheets

U.S. PATENT DOCUMENTS

| | | |
|---|---|---|
| 2002/0131344 A1 | 9/2002 | Kadlec et al. |
| 2002/0136112 A1 | 9/2002 | Kadlec et al. |
| 2002/0136114 A1 | 9/2002 | Kadlec et al. |
| 2002/0136115 A1 | 9/2002 | Kadlec et al. |
| 2002/0141302 A1 | 10/2002 | Kadlec et al. |
| 2002/0145953 A1 | 10/2002 | Kadlec et al. |
| 2003/0031100 A1 | 2/2003 | Kadlec et al. |
| 2003/0193727 A1 | 10/2003 | Fioravanti et al. |

* cited by examiner

SPECTRAL ANALYSIS OF A POSITION ERROR SIGNAL

FIELD OF THE DISCLOSURE

The present disclosure relates generally to spectral analysis of a position error signal. More specifically, the present disclosure relates to spectral analysis of a position error signal in a data storage device.

BACKGROUND

In a magnetic data storage device, as the data density of magnetic discs increases, the distance between the transducing head and the disc decreases to very small distances. In such systems, there is an increased possibility of contact between the head and the disc due to factors such as built up particle contamination, slider manufacturing process limitations, limited air-bearing modeling capabilities, and other occurrences. Contact between the head and disc can cause errors when writing or reading data and can result in an increased risk of failure of the magnetic data storage device.

There is a need for a method and device for sensing contact between a transducer and a disc.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present invention.

The present disclosure is directed to a method including analyzing a spectral content of a position error signal. The method also includes comparing the spectral content to a threshold. The method also includes generating a result based on the comparing the spectral content to the threshold.

In another embodiment, the disclosure is directed to a computer-readable medium having instructions for causing a processor to execute a method including analyzing a spectral content of a position error signal. The method also includes comparing the spectral content to a threshold. The method also includes generating a result based on comparing the spectral content to the threshold.

In yet another embodiment, the disclosure is directed to a device including a buffer for storing position error samples. The device also includes a processor programmed to analyze at least one magnitude of at least one frequency spectra of the position error samples. The processor is also programmed to compare the at least one magnitude to a threshold. In addition, the processor is programmed to generate a result based on comparing the at least one magnitude to the threshold.

Figure 1:
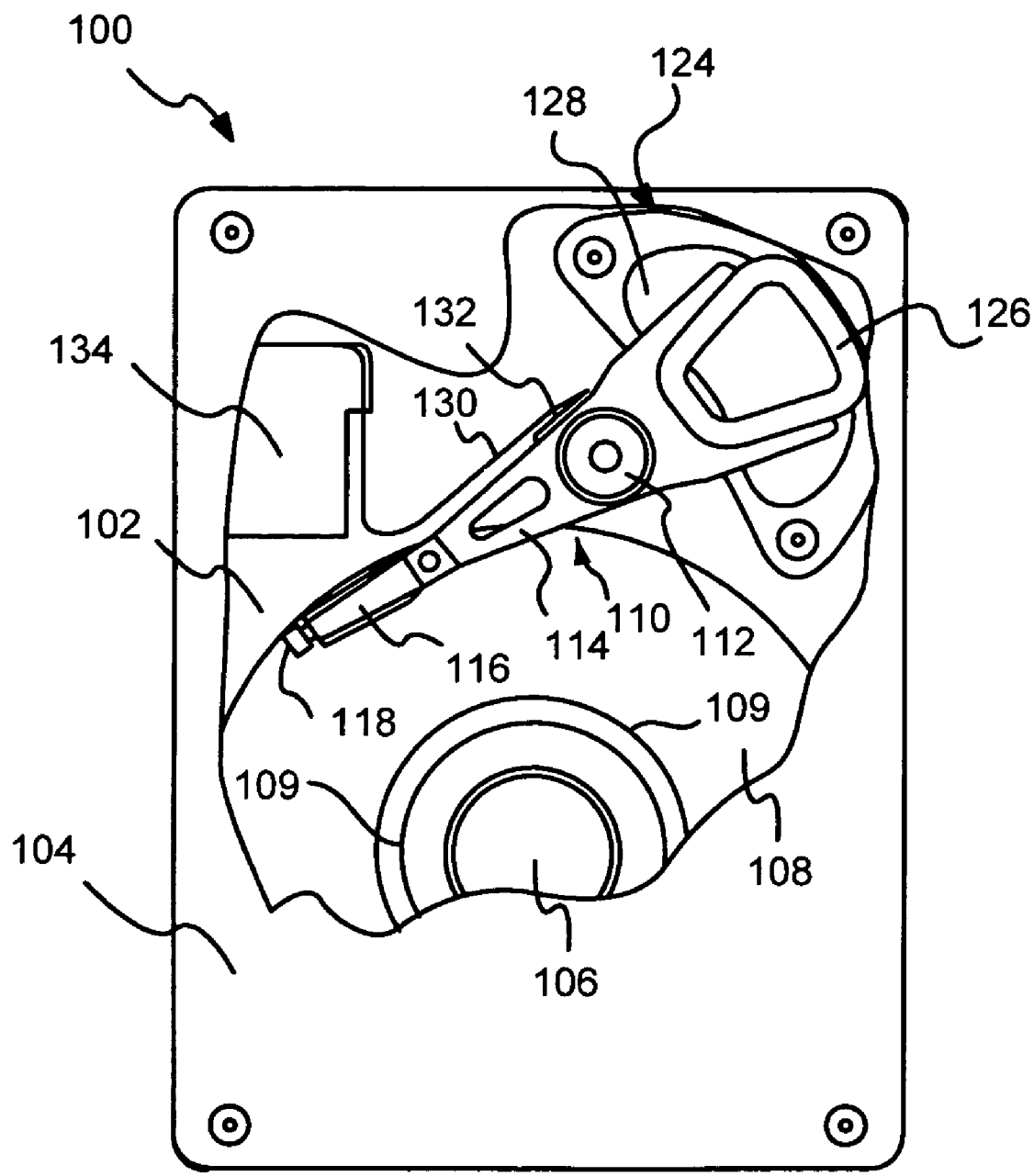
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

In a particular embodiment, the heads 118 can have a small heater coil (not shown) embedded in them that is used to adjust the protrusion of a read element (not shown) and a write element (not shown) in order to fine tune a distance between the read and write elements (not shown) and the magnetic surface of the discs 108. Firmware is used to adjust a current through the heater coil (not shown). The current affects the heater coil's thermal expansion and moves the read and write elements (not shown) closer to or farther from the discs 108. The actuation of the read and write elements generated by the heater coil may be sufficient to cause the heads 118 to contact the discs 108 when an excessive current is applied to the heater coil. During the manufacturing process of a disc drive 100, the heads 118 are intentionally made to contact the discs 108 using the heater coil so that correct heater current values can be determined for each of the heads 118.

Figure 2:
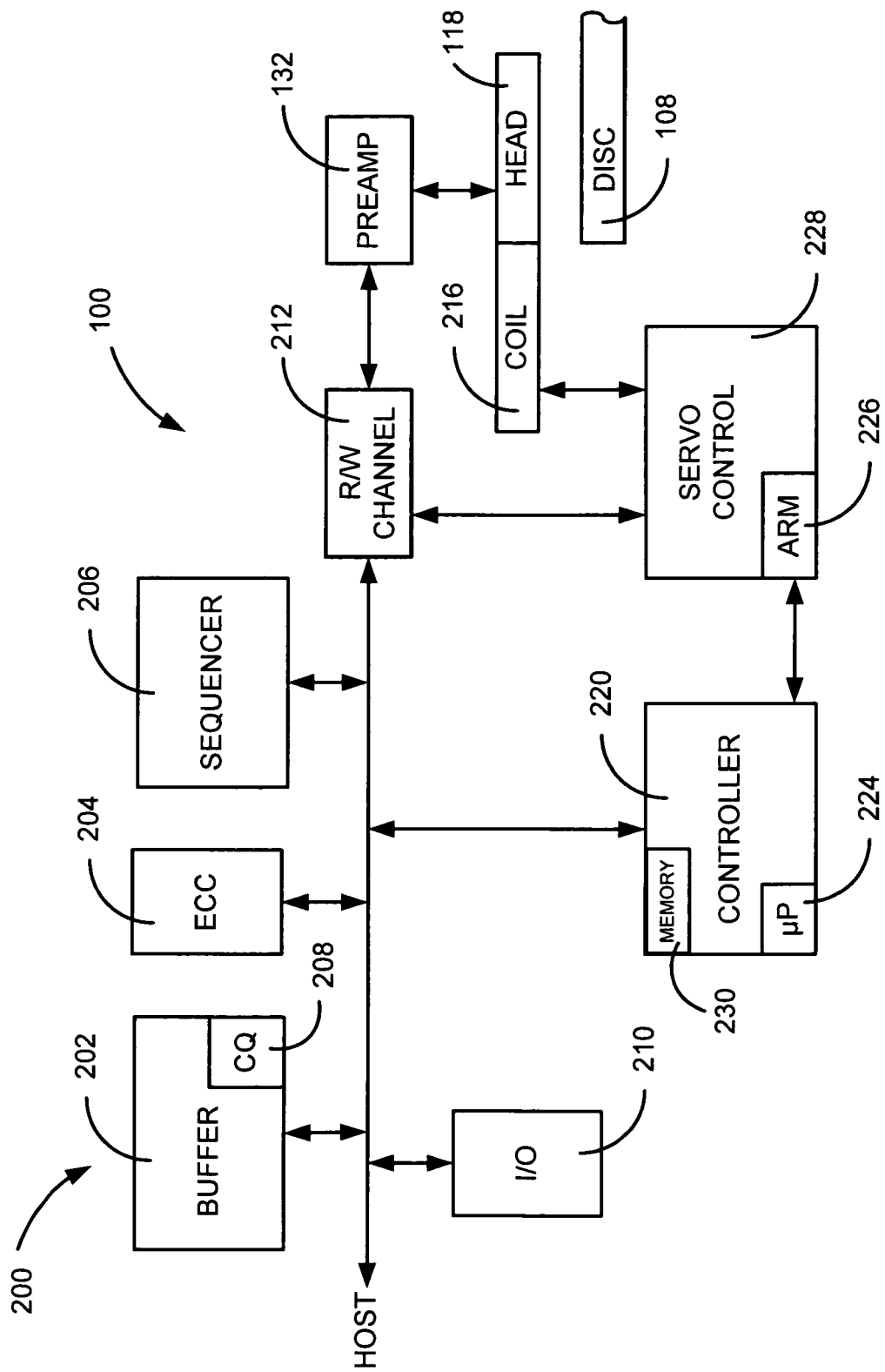
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated microprocessor 224 and memory 230. In a particular embodiment, memory 230 is a first-in-first-out (FIFO) buffer. The interface circuit 200 also includes a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The ECC block 204 applies on-the-fly error detection and correction to retrieved data. The sequencer 206 asserts read and write gates to direct the reading and writing of data. The I/O block 210 serves as an interface with the host device.

FIG. 2 further shows the disc drive 100 to include a read/write (R/W) channel 212 which encodes data during write operations and reconstructs user data retrieved from the discs 108 during read operations. A preamplifier/driver circuit (preamp) 132 applies write currents to the heads 118 and provides pre-amplification of readback signals.

A servo control circuit 228 uses servo data to provide the appropriate current to the coil 216 to position the heads 118. The controller 220 communicates with a processor 226 to move the heads 118 to the desired locations on the discs 108 during execution of the various pending commands in the command queue 208.

Figure 3:
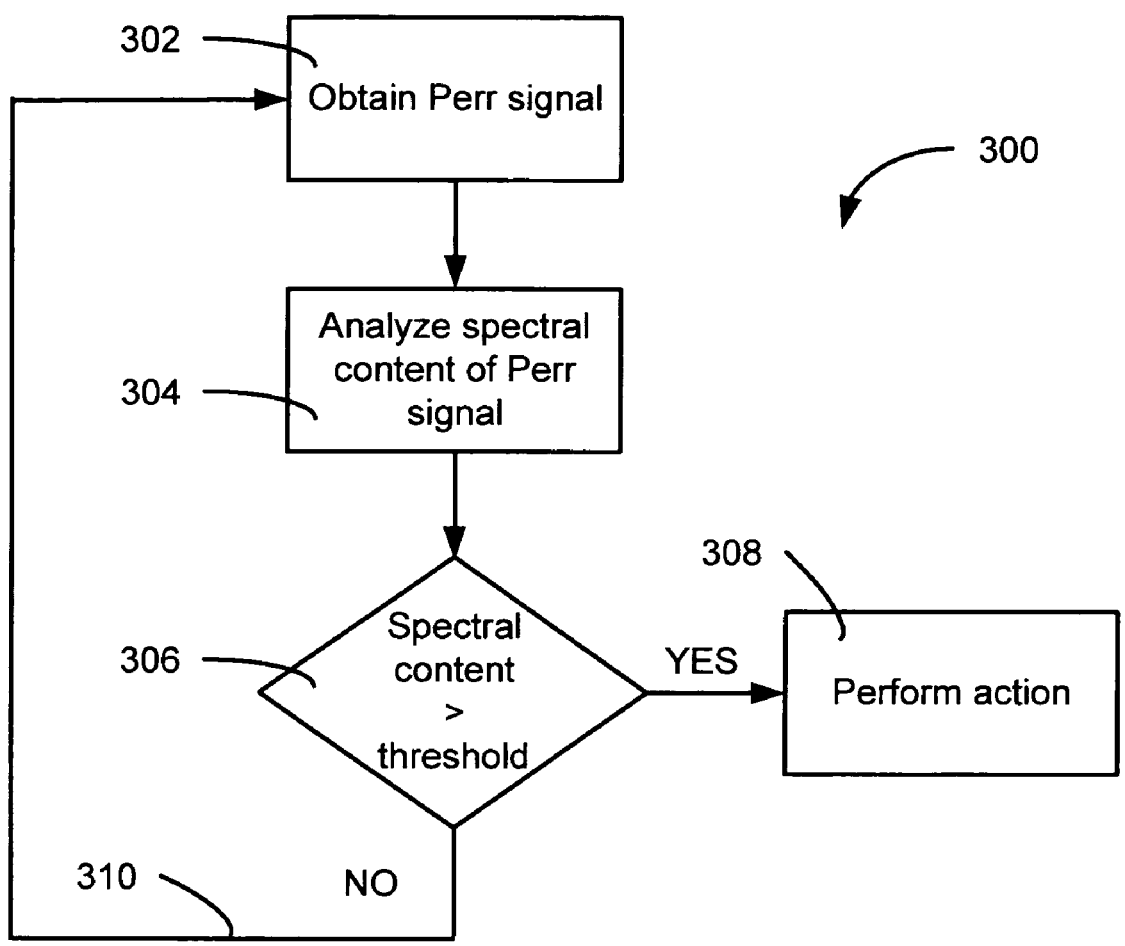
FIG. 3 is a flow diagram of an illustrative embodiment of a method for analyzing spectral content of a position error signal.

Referring to FIG. 3, a method 300 for analyzing spectral content of a position error signal is shown. In a particular embodiment, the method includes obtaining a position error signal, at 302. Additionally, the method 300 analyzes a spectral content of the position error signal, at 304. In another particular embodiment, the position error signal is based on position error samples stored in a memory. In a particular embodiment, the spectral content is a particular frequency range of the position error signal.

Further, the method 300 compares the spectral content to a threshold, at 306. The threshold may be determined based on the operating characteristics of a device implementing the method 300. In a particular embodiment, the threshold is a fixed threshold. In another particular embodiment, the threshold is an adaptive threshold. In yet another particular embodiment, the threshold is an adaptive threshold based on a relative change in magnitude.

In a particular embodiment, when the spectral content is greater than the threshold, a specific action is performed, at 308. In a particular embodiment, the specific action is a data recovery routine in a data storage device. When the spectral content is less than the threshold, the method 300 returns, at 310, to obtaining the position error signal, at 302.

In another particular embodiment, a data storage device, such as the disc drive 100, may implement the method 300 to generate a real-time feedback signal that indicates when a transducer, such as the heads 118, is contacting a data storage medium, such as the disc 108. In other words, the method 300 may be performed continuously during operation of the data storage device. Alternatively, the method 300 can be performed periodically as needed during operation of the data storage device. In a particular embodiment, the method 300 is performed during an interrupt servo routine (ISR) of the data storage device.

The method 300 may be implemented in controller 220 and the position error signal provided from the read/write channel 212. In a particular embodiment, the memory 230 stores the position error signal. In another particular embodiment, the memory 230 is a first-in-first-out (FIFO) buffer that stores sampled data representative of the position error signal. In yet another particular embodiment, the specific action for a data storage device, such as disc drive 100, is a data recovery action.

Any objective that needs to monitor specific frequency content of a position error signal could use the method 300. In a particular embodiment, the data storage device can use method 300 to monitor performance characteristics of the transducer other than head to disc contact. For example, the data storage device can detect specific frequency content during seek settling in order to postpone the data storage device from entering an on-track state when the presence of certain known oscillations are detected.

Figure 4:
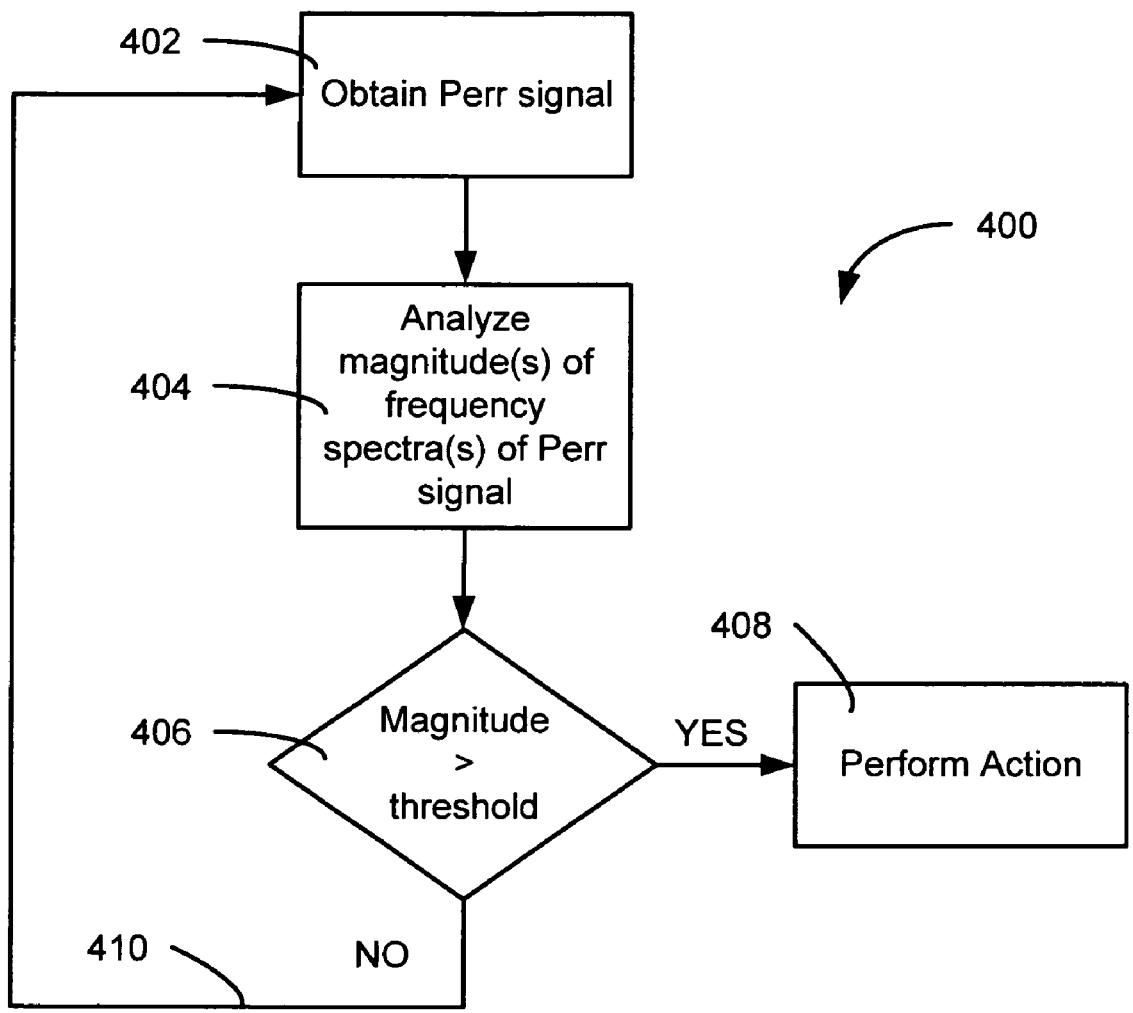
FIG. 4 is a flow diagram of another illustrative embodiment of a method for analyzing spectral content of a position error signal.

Referring to FIG. 4, a method 400 for analyzing spectral content of a position error signal is shown. In a particular embodiment, the method includes obtaining a position error signal, at 402. In another particular embodiment, the position error signal is based on position error samples stored in a memory.

Additionally, the method 400 analyzes a spectral content of the position error signal, at 404. In a particular embodiment, the spectral content is analyzed by analyzing at least one magnitude of at least one frequency spectra of the position error signal. In another particular embodiment, the spectral content is analyzed by analyzing more than one magnitude of more than one frequency spectra. In another particular embodiment, more than one frequency spectra are analyzed simultaneously. In a particular embodiment, the frequency spectra is a specific frequency range. In yet another particular embodiment, the frequency spectra is defined by at least one sine/cosine table stored in firmware or in a memory.

Further, the method 400 compares the magnitude to a threshold, at 406. The threshold may be determined based on the operating characteristics of a device implementing the method 400. In a particular embodiment, the threshold is a fixed threshold. In another particular embodiment, the threshold is an adaptive threshold. In yet another particular embodiment, the threshold is an adaptive threshold based on a relative change in magnitude.

In a particular embodiment, when the magnitude is greater than the threshold, a specific action is performed, at 408. In a particular embodiment, the specific action is a data recovery routine in a data storage device. When the magnitude is less than the threshold, the method 400 returns, at 410, to obtaining the position error signal, at 402.

In a particular embodiment, comparing the magnitude to the threshold, at 406, detects an adverse event. In another particular embodiment, the adverse event is an oscillation in a data storage device, such as disc drive 100. In yet another particular embodiment, the adverse event is contact between a transducer, such as heads 118, and a data storage medium, such as disc 108.

In another particular embodiment, a data storage device, such as the disc drive 100, may implement the method 400 to generate a real time feedback signal that indicates when a transducer, such as the heads 118, is contacting a data storage medium, such as the disc 108. In other words, the method 300 may be performed continuously during operation of the data storage device. Alternatively, the method 300 can be performed periodically as needed during operation of the data storage device. In a particular embodiment, the method 300 is performed during an interrupt servo routine (ISR) of the data storage device.

The method 400 may be implemented in controller 220 and the position error signal provided from the read/write channel 212. In a particular embodiment, the memory 230 stores the position error signal. In another particular embodiment, the memory 230 is a first-in-first-out (FIFO) buffer that stores sampled data representative of the position error signal. In yet another particular embodiment, the specific action for a data storage device, such as disc drive 100, is a data recovery action.

Any objective that needs to monitor specific frequency content of a position error signal could use the method 400. In a particular embodiment, the data storage device can use method 400 to monitor performance characteristics of the transducer other than head to disc contact. For example, the data storage device can detect specific frequency content during seek settling to postpone the data storage device from entering an on-track state when the presence of certain known oscillations are detected.

Figure 5:
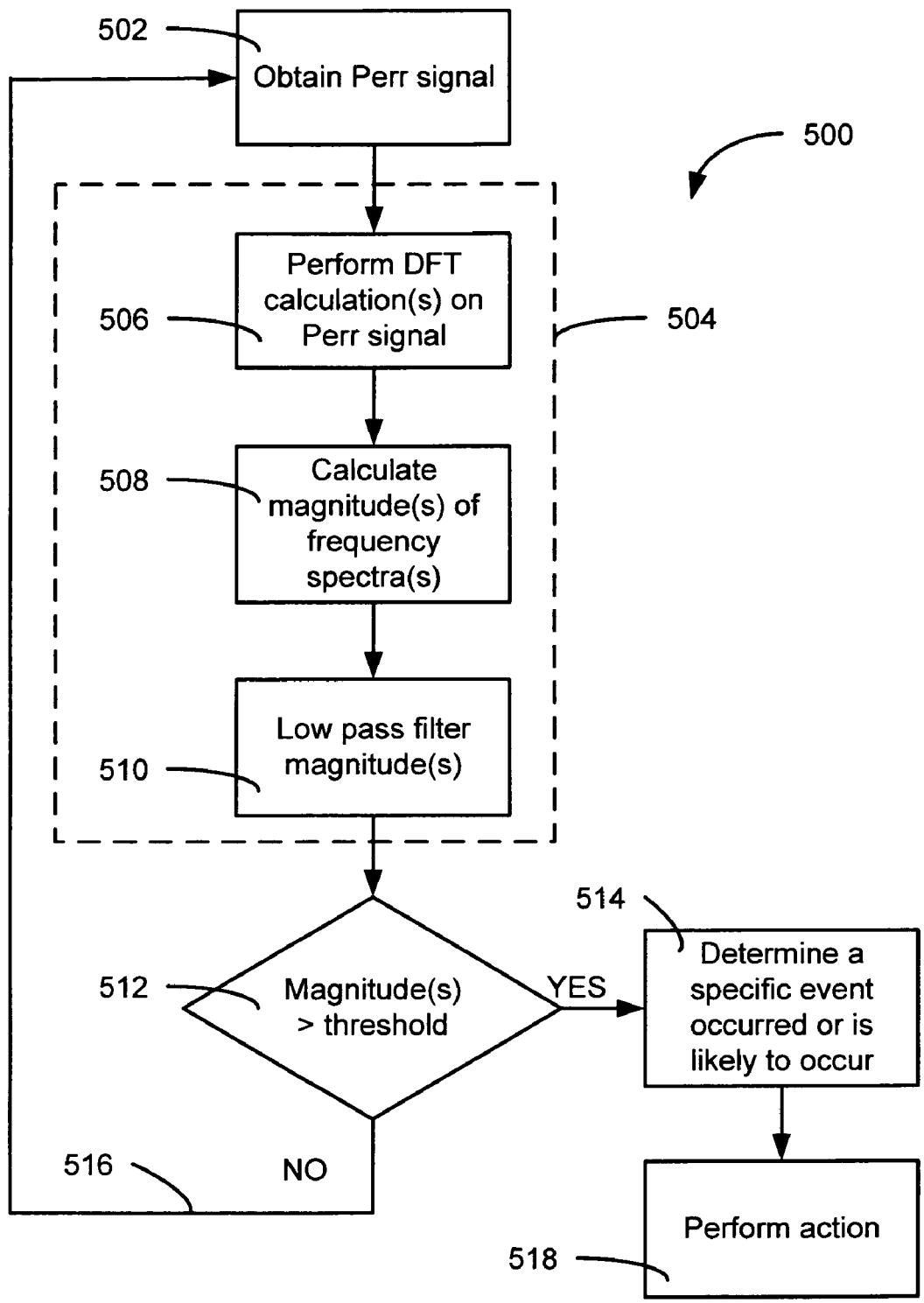
FIG. 5 is a flow diagram of yet another illustrative embodiment of a method for analyzing spectral content of a position error signal.

Referring to FIG. 5, a method 500 for analyzing spectral content of a position error signal is shown. In a particular embodiment, the method includes obtaining a position error signal, at 502. In another particular embodiment, the position error signal is based on position error samples stored in a memory.

Additionally, the method 500 analyzes a spectral content of the position error signal, at 504. In a particular embodiment, the spectral content is analyzed by performing at least one Discrete Fourier Transform (DFT) calculation on the position error signal, at 506. Then, at least one magnitude of at least one frequency spectra of the position error signal is calculated from the result of the DFT calculation, at 508. The magnitude is then low-pass filtered, at 510. In another particular embodiment, the spectral content is analyzed by analyzing more than one magnitude of more than one frequency spectra. In a particular embodiment, the frequency spectra is a specific frequency range. In yet another particular embodiment, the frequency spectra is defined by at least one sine/cosine table stored in firmware or in a memory.

In another particular embodiment, the position error samples are convolved with the at least one sine/cosine table to generate frequency components and the at least one magnitude is calculated from the frequency components.

Further, the method 500 compares the low-pass filtered magnitude to a threshold, at 512. The threshold may be determined based on the operating characteristics of a device implementing the method 500. In a particular embodiment, the threshold is a fixed threshold. In another particular embodiment, the threshold is an adaptive threshold. In yet another particular embodiment, the threshold is an adaptive threshold based on a relative change in magnitude.

In a particular embodiment, when the low-pass filtered magnitude is greater than the threshold, the method 500 determines a specific event occurred or is likely to occur, at 514. The method then performs a specific action, at 518. In a particular embodiment, the specific action is a data recovery routine in a data storage device. When the low-pass filtered magnitude is less than the threshold, the method 500 returns, at 516, to obtaining the position error signal, at 502.

In another particular embodiment, a first independently monitored frequency is compared to a second independently monitored frequency, at 512, to determine an event. The method then performs a specific action, at 518.

In a particular embodiment, comparing the magnitude to the threshold, at 512, determines an adverse event, at 514. In another particular embodiment, the adverse event is an oscillation in a data storage device, such as disc drive 100. In yet another particular embodiment, the adverse event is contact between a transducer, such as heads 118, and a data storage medium, such as disc 108.

In a particular embodiment, a data storage device, such as the disc drive 100, may implement the method 500 to generate a real time feedback signal that indicates when a transducer, such as the heads 118, is contacting a data storage medium, such as the disc 108. The method may be implemented in controller 220 and the position error signal provided from the read/write channel 212. In a particular embodiment, the memory 230 stores the position error signal. In another particular embodiment, the memory 230 is a first-in-first-out (FIFO) buffer that stores sampled data representative of the position error signal.

In a particular embodiment of a data storage device implementing method 500, the FIFO buffer stores 26 samples of the position error signal. In addition, three frequency spectra are calculated every ISR. The frequency spectra are defined by three sine/cosine tables each having eight complete cycles of data stored in them. The sine/cosine coefficients are kept as tables in the firmware. The tables store sine/cosine coefficients in lengths of 22, 24, and 26 samples, with each sine/cosine table having one of the lengths. The different lengths of the sine/cosine tables result in different frequency spectrum ranges for each table. The center of the frequency range is 10.47 kHz, 9.6 kHz, and 8.86 kHz, respectively. The width of the frequency ranges is approximately 900 Hz. Including 8 complete cycles of coefficient data in all 3 tables reduces the need to apply windowing to the input signals.

In operation, the previous N position error signal samples are convolved with the sine/cosine tables to yield respective frequency components every ISR. For example, the last 22 position error signal samples are convolved with the 22 samples in the sine/cosine table having 22 samples. In another example, the last 24 position error signal samples are convolved with the 24 samples in the sine/cosine table having 24 samples. In yet another example, the last 26 position error signal samples are convolved with the 26 samples in the sine/cosine table having 26 samples.

The resulting frequency components are used to calculate the magnitude of the specific frequency components. The magnitude can be calculated by squaring the resulting frequency components. The magnitudes are then filtered using an exponential low pass filter according to the following:

$$LPF_{output} = (1/N) * \text{input} + (N-1)/N * \text{previous\_output};$$

where $LPF_{output}$ = the output of the low pass filter;
N = number of position error samples;
input = the frequency component being filtered; and
previous_output = the $LPF_{output}$ of the previous frequent component being filtered.

The output of the low pass filter is then compared to a fixed threshold and if the output exceeds the fixed threshold, error recovery procedures are initiated. The threshold can be chosen by empirical experimentation.

Alternatively, chirp tables, that is tables with an increasing frequency range over the table, could be used in place of the single frequency sine/cosines tables. This would allow the same frequency range to be monitored with a single set of calculations but may require more position error samples and longer coefficient tables.

In another alternative, instead of using a DFT method, a finite impulse response (FIR) filter could be used. This method would allow more flexibility to monitor frequencies and would require more position error samples and a FIR coefficient table.

Any objective that needs to monitor specific frequency content of a position error signal could use the method 500. In a particular embodiment, the data storage device can use method 500 to monitor performance characteristics of the transducer other than head to disc contact. For example, the data storage device can detect specific frequency content during seek settling to postpone the data storage device from entering an on-track state when the presence of certain known oscillations are detected.

In accordance with various embodiments, the methods described herein may be implemented as one or more software programs running on a computer processor or controller, such as the controller 220. In accordance with another embodiment, the methods described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
  analyzing a spectral content of a position error signal;
  comparing the spectral content to a threshold;
  determining a result based on the comparing the spectral content to the threshold; and
  detecting contact between a transducer and a data storage medium based on the result, wherein analyzing the spectral content further comprises analyzing at least one magnitude of at least one frequency spectra of the position error signal and wherein the contact between the transducer and the data storage medium is detected when the result indicates the at least one magnitude is greater than the threshold.

2. The method of claim 1, further comprising filtering the at least one magnitude with a low pass filter.

3. The method of claim 1, further comprising detecting contact between the transducer and the data storage medium when the result indicates the spectral content is greater than the threshold.

4. The method of claim 3, wherein the method of detecting contact is performed continuously during operation of a data storage device.

5. The method of claim 3, further comprising providing a real-time feedback signal in a data storage device to determine the result, wherein the real-time feedback signal monitors a transducer's operating performance.

6. The method of claim 5, wherein the transducer's operating performance is a distance between the transducer and a data storage medium.

7. The method of claim 6, wherein more than one frequency spectra are analyzed simultaneously.

8. The method of claim 1, wherein the threshold is a fixed threshold.

9. The method of claim 1, wherein the threshold is an adaptive threshold.

10. The method of claim 1, wherein analyzing the spectral content further comprises performing at least one Discrete Fourier Transform (DFT) calculation on the position error signal.

11. The method of claim 10, further comprising calculating the magnitudes of the at least one frequency spectra based on an output of the at least one DFT calculation.

12. The method of claim 10, further comprising performing the DFT during a servo interrupt service routine (ISR).

13. The method of claim 1, wherein the at least one frequency spectra is defined by at least one sine/cosine table and the position error signal is convolved with the at least one sine/cosine table to generate frequency components.

14. The method of claim 13, wherein the position error samples are convolved with the at least one sine/cosine table to generate the frequency components during successive interrupt servo routines.

15. The method of claim 1, wherein multiple frequencies are analyzed independently and a first independently monitored frequency is compared to a second independently monitored frequency.

16. A computer-readable medium having instructions for causing a processor to execute a method comprising:
  analyzing a spectral content of a position error signal;

comparing the spectral content to a threshold;
determining a result based on comparing the spectral content to the threshold; and
detecting contact between a transducer and a data storage medium based on the result, wherein analyzing the spectral content further comprises analyzing at least one magnitude of at least one frequency spectra of the position error signal and wherein the contact between the transducer and the data storage medium is detected when the result indicates the at least one magnitude is greater than the threshold.

17. A computer-readable medium of claim 16, wherein analyzing the spectral content further comprises analyzing at least one magnitude of at least one frequency spectra of the position error signal.

18. A device comprising:
a buffer for storing position error samples;
a processor programmed to
    analyze at least one magnitude of at least one frequency spectra of the position error samples;
    compare the at least one magnitude to a threshold;
    determine a result based on comparing the at least one magnitude to the threshold; and
    detect contact between a transducer and a data storage medium based on the result, wherein the contact between the transducer and the data storage medium is detected when the result indicates the at least one magnitude is greater than the threshold.

19. The device of claim 18, further comprising:
a data storage medium;
a transducer movably disposed in relation to the data storage medium, wherein the transducer reads data from the data storage medium; and
wherein the result is monitored to determine contact between the transducer and the data storage medium.

* * * * *